(12) United States Patent
Sala et al.

(10) Patent No.: US 10,511,691 B2
(45) Date of Patent: Dec. 17, 2019

(54) CONFIGURATION METHOD, EQUIPMENT, SYSTEM AND COMPUTER READABLE MEDIUM FOR DETERMINING A NEW CONFIGURATION OF CALCULATION RESOURCES

(71) Applicant: Alcatel Lucent, Boulogne Billancourt (FR)

(72) Inventors: Alessandra Sala, Blanchardstown (IE); Diego Lugones, Blanchardstown (IE); Yue Jin, Blanchardstown (IE); Volker Friedrich Hilt, Stuttgart (DE)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 15/517,052

(22) PCT Filed: Sep. 9, 2015

(86) PCT No.: PCT/EP2015/070634
§ 371 (c)(1),
(2) Date: Apr. 5, 2017

(87) PCT Pub. No.: WO2016/055229
PCT Pub. Date: Apr. 14, 2016

(65) Prior Publication Data
US 2017/0244808 A1 Aug. 24, 2017

(30) Foreign Application Priority Data
Oct. 10, 2014 (EP) .................................... 14306606

(51) Int. Cl.
*H04L 29/08* (2006.01)
*H04L 12/24* (2006.01)

(52) U.S. Cl.
CPC ........ *H04L 67/325* (2013.01); *H04L 41/0813* (2013.01); *H04L 41/142* (2013.01); *H04L 67/10* (2013.01)

(58) Field of Classification Search
CPC ... H04L 41/0816; H04L 45/28; H04L 5/0055; H04L 67/16; H04L 67/34; H04L 41/5025;
(Continued)

(56) References Cited

U.S. PATENT DOCUMENTS 8,782,211 B1 7/2014 Sharma
2005/0240668 A1* 10/2005 Rolia ..................... H04L 67/22
709/223
(Continued)

FOREIGN PATENT DOCUMENTS

JP 2009-169780 A 7/2009

OTHER PUBLICATIONS

Hadi Goudarzi et al., "Demand-Side Load Scheduling Incentivized by Dynamic Energy Prices," Smart/Virtual Metering, Demand Response, Dynamic Pricing, International Conference on Smart Grip Communications (SmartGridComm) IEEE, pp. 351-356, XP032073398, 2011.
(Continued)

*Primary Examiner* — Djenane M Bayard
(74) *Attorney, Agent, or Firm* — Fay Sharpe LLP

(57) ABSTRACT

A configuration method, equipment, system and computer readable medium for determining a new configuration of calculation resources associated to a function and to at least one future time slot, the calculation resources being defined as different calculation capacities allocated to the function during a time slot and included within at least one computer, the configuration method comprising a first step of determining an old demand, a second step of determining a plurality of conditional probabilities associated to the old (Continued)

demand and to a plurality of new demands, a third step of determining a plurality of reconfiguration costs associated to a plurality available configurations, a step of selecting the new configuration as being the available configuration associated to the minimal reconfiguration cost.

12 Claims, 5 Drawing Sheets

(58) Field of Classification Search
CPC ....... H04L 5/0035; H04L 65/80; H04L 67/10; H04L 67/303; H04L 41/0659; H04L 41/0803; H04L 41/082; H04L 41/0836; H04L 41/0896; H04L 43/0811; H04L 47/10; H04L 1/1861; H04L 43/0888; H04L 47/27; H04L 63/1425; H04L 63/1441; H04L 2463/141; H04L 63/1483; H04L 63/1416; H04L 67/306; H04L 5/0053; H04L 29/06; H04L 63/0227; H04L 63/1408; H04L 63/145; H04L 63/164; H04L 63/166; H04L 67/325; H04L 67/327; H04L 69/329; H04L 5/0048; H04L 63/14; H04L 5/001; H04L 1/001; H04L 1/0057
See application file for complete search history.

(56) References Cited

U.S. PATENT DOCUMENTS

| | | | |
|---|---|---|---|
| 2006/0029097 A1* | 2/2006 | McGee | H04L 47/10 370/468 |
| 2010/0027425 A1 | 2/2010 | Cheung et al. | |
| 2013/0042003 A1* | 2/2013 | Franco | H04L 67/1097 709/226 |
| 2013/0204983 A1* | 8/2013 | Kenkre | G06F 9/50 709/220 |
| 2014/0297833 A1 | 10/2014 | Bedini et al. | |
| 2015/0318944 A1* | 11/2015 | Wigren | H04B 17/345 370/230 |

OTHER PUBLICATIONS

International Search Report for PCT/EP2015/070634 dated Oct. 7, 2015.

* cited by examiner

CONFIGURATION METHOD, EQUIPMENT, SYSTEM AND COMPUTER READABLE MEDIUM FOR DETERMINING A NEW CONFIGURATION OF CALCULATION RESOURCES

FIELD OF INVENTION

The present subject matter relates to optimization of the resource dedicated to the implementation of different functions within a cloud, particularly but not exclusively to the concept of Virtualized Network Function.

BACKGROUND

Recently, the concept of Virtualized Network Function has been introduced to apply Information Technology (IT) virtualization technologies to telecommunication network functions. In fact, this modern telecommunication infrastructure aims to leverage the benefits of deploying Network Functions onto a virtualized environment (e.g., Cloud infrastructure). These benefits are the improvement of, for example but not limited to, the dependability, the Quality of Experience (QoE). These benefits are also the reduction of Capital Expenses (CapEx) and Operating Expenses (OpEx).

However, telecommunication services, particularly but not limited to those of Evolved Packet Core (EPC), IP Multimedia Subsystem (IMS) and Content Delivery Network (CDN), are run with large over provisioning that in cloud environment doesn't make sense given the elastic capabilities of scheduling and instantiating/releasing virtual resources. In order to take full advantage from the virtualized environment and the possibility of optimizing service chain resources on actual demand, the cloud infrastructure used to realize the network functions should provide a set of predictive analytics functionalities that are not present in the system or method of the state of the art.

It is also know the conference paper of Hadi Goudarzi et al. "Demand-side load scheduling incentivized by dynamic energy prices" published within the IEEE International conference on smart grid communications the 17 of Oct. 2011.

SUMMARY

This summary is provided to introduce concepts related to reconfiguration of resources allocated to network functions and, particularly but not exclusively, to the reconfiguration of resources allocated to different function within a cloud system.

In one implementation a configuration method is described. This method is configured to determine a new configuration of calculation resources associated to a function and to at least one future time slot, the calculation resources being defined as different calculation capacities allocated to the function during a time slot and included within at least one computer. the configuration method comprising; a first step of determining an old demand associated to the function and to at least one previous time slot, the previous times slots being located before the future time slots, and, a second step of determining a plurality of conditional probabilities associated to the old demand and to a plurality of new demands, these conditional probabilities representing the probability that previous time slots handling old demands are being follow by future time slots handling new demands and, a third step of determining a plurality of reconfiguration costs associated to a plurality available configurations of calculation resources associated to the new capacities and using the old demands and/or the old capacity and/or the new demands and/or the plurality of conditional probabilities and/or an operating cost per unit of capacity per time slot and/or a penalty cost per unit of demand unsatisfied per time slot and/or a scaling cost per unit of capacity and/or, a duration of the time slots. The method also comprises a step of selecting the new configuration as being the available configuration associated to the minimal reconfiguration cost.

In one implementation an equipment is described. This equipment is configured to determine a new configuration of calculation resources associated to a function and to at least one future time slot. The calculation resources are defined as different calculation capacities allocated to the function during a time slot and included within at least one computer. The equipment comprises a first determination module, configured to determine an old demand associated to the function and to at least one previous time slot, a second determination module, configured to determine a plurality of conditional probabilities associated to the old demand and to a plurality of new demands, these conditional probabilities representing the probability that previous time slots handling an old demands are being follow by future time slots handling new demands and, a third determination module, configured to determine a plurality of reconfiguration costs associated to a plurality of available configurations of calculation resources associated to the new capacities and using; the old demands and/or the old capacity and/or the new demands and/or the plurality of conditional probabilities and/or an operating cost per unit of capacity per time slot and/or a penalty cost per unit of demand unsatisfied per time slot and/or a scaling cost per unit of capacity and/or, a duration of the time slots. The equipment also comprises a selection module configured to select the new configuration as being the available configuration associated to the minimal reconfiguration cost.

In one implementation a system is described. The system is configured to determine a new configuration of calculation resources associated to a function and to at least one future time slot, the calculation resources being defined as different calculation capacities allocated to the function during a time slot and included within at least one computer. The system comprises at least one equipment and each equipment comprises at least one processor; and at least one memory coupled to the processor. At least one of the memories comprises a first determination module, configured to determine an old demand associated to the function and to at least one previous time slot, at least one of the memories comprising a second determination module, configured to determine a plurality of conditional probabilities associated to the old demand and to a plurality of new demands, these conditional probabilities representing the probability that previous time slots handling an old demands are being follow by future time slots handling new demands and, at least one of the memories comprising a third determination module, configured to determine a plurality of reconfiguration costs associated to a plurality of available configurations of calculation resources associated to the new capacities and using; the old demands and/or the old capacity and/or the new demands and/or the plurality of conditional probabilities and/or an operating cost per unit of capacity per time slot and/or a penalty cost per unit of demand unsatisfied per time slot and/or a scaling cost per unit of capacity and/or, a duration of the time slots at least one of the memories comprises a selection module configured to select the new configuration as being the available configuration associated to the minimal reconfiguration cost.

In one implementation a computer-readable medium is described. The computer-readable medium has embodied thereon a computer program configured to realize a configuration method for determining a new configuration of calculation resources associated to a function and to at least one future time slot, the calculation resources being defined as different calculation capacities allocated to the function during a time slot and included within at least one computer. The configuration method comprises a first step of determining an old demand associated to the function and to at least one previous time slot, the previous times slots being located before the future time slots, and, a second step of determining a plurality of conditional probabilities associated to the old demand and to a plurality of new demands, these conditional probabilities representing the probability that previous time slots handling old demands are being follow by future time slots handling new demands and, a third step of determining a plurality of reconfiguration costs associated to a plurality available configurations of calculation resources associated to the new capacities and using the old demands and/or the old capacity and/or the new demands and/or the plurality of conditional probabilities and/or an operating cost per unit of capacity per time slot and/or a penalty cost per unit of demand unsatisfied per time slot and/or a scaling cost per unit of capacity and/or, a duration of the time slots. The method also comprises a step of selecting the new configuration as being the available configuration associated to the minimal reconfiguration cost.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

In an embodiment, the cloud infrastructure, used to realize the network functions, is managed with a responsive approach that triggers the virtual functions elasticity based on current reading of traffic load. This responsive approach operates in a way the service adjusts its resources after the increase or decrease of incoming load is experienced.

Figure 1:
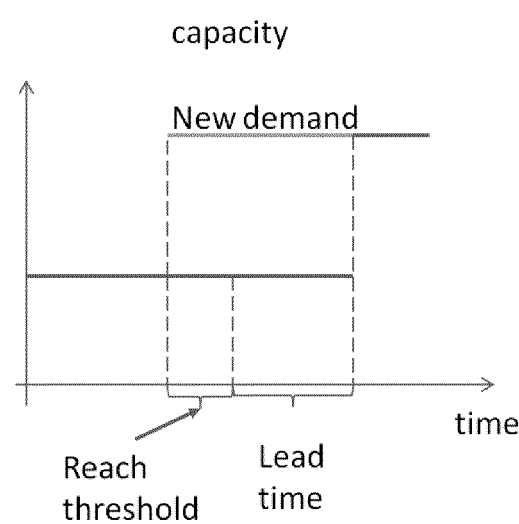
FIG. 1 illustrates the effect of the reconfiguration lead time.

In this embodiment, the cloud infrastructure reacts to current load conditions and it takes some lead time before the service can optimize service chain resources which would be effectively able to serve the actual load. The lead time can be thought as the time to instantiate a new virtual element plus the time to configure it for the actual usage as showed in FIG. 1. Therefore, the system suffers of suboptimal configurations each time the system has to reconfigure the resources associated to each virtual function of the service chain. This lead time determines the cost that the service has to pay during these transition periods in terms of Service Level Agreement (SLA) violations, poor quality of service and management costs.

In another embodiment, the cloud infrastructure, operated in virtual environments, implements this responsive approach by monitoring the incoming load and matching this load to some static thresholds that launch alarms when the load is above or below their indicators.

In another embodiment, each telecommunication service is generally managed by responding to incoming load that trigger thresholds that indicate whether a specific virtual function has to grow or shrink to satisfy the actual traffic pattern or demand. In this document traffic pattern and demand are considering as being synonym. For example, a Voice over IP application over IMS, typically involves several functions running in a virtual machine. The demand can for example be described as a number of calls per minute in case of a Voice over IP application. This demand can also be a number of SMS message per minute, a number of data packets per minute, or a number of bits per second. A virtual machine is a software-based emulation of a computer. Virtual machines operate based on the computer architecture and functions of a real or hypothetical computer. The resource management of the different functions is governed by specific thresholds that trigger the elastic scaling when the incoming load varies.

In another embodiment, the cloud infrastructure implements reactive scaling decisions by using a combination of system alarms. These alarms are for example defined by the Central Processing Unit (CPU) utilization, the memory usage, etc, that can be integrated in diverse ways to create a scaling decision. However this embodiment makes no use of application level indicators, information about the functions running on different virtual machines and the load patterns that affect the performances of these virtual functions.

In another embodiment of the present subject matter a method to configure a virtualized infrastructure is presented. This method allows the growing or shrinking of the resources allocated to the virtual functions. So this method allows the determination of a new configuration of calculation resources associated and dedicated to a function. This determination is realized for at least one future time slot. The calculation resources are defined as different calculation capacities allocated to the function during a time slot and included within at least one computer. By computer we mean a real computer or a virtual machine with known and fixed capacity. This configuration method, presented FIG. 2, comprises the following step;

A first step 201 of determining an old demand associated to the function and to at least one previous time slot. The previous times slots are located before the future time slots. The aim of this first step of determination is to determine a representation of the incoming load by smoothing traffic variations based on the historical analysis of the time-series traffic variation characteristics. This step is also called step of analytics load prediction monitors.

There is direct relation between the traffic pattern or demand, the incoming load, the incoming traffic, the capacity and the configuration of the calculation resources. Capacities are calculation resources used to process demands. If the capacity is higher than the demand, the capacity is underutilized and this represents a waste of resources. If the capacity is lower than the demand, the deficiency causes service degradation and this may incur penalties according to service level agreements. The capacity and demand are expressed by using the same unit but they are not representing the same element. The capacity represents what is currently handleable by the system and the demand what should the system handle in the future time slot.

A second step 202 of determining a plurality of conditional probabilities associated to the old demand and to a plurality of new demands, these conditional probabilities representing the probability that previous time slots handling old demands are being follow by future time slots handling new demands.

In an embodiment this second step 202 of determining could be realized within an offline part of the method and could be store for a further realization of the other step of the method.

A third step 203 of determining a plurality of reconfiguration costs associated to a plurality available configurations of calculation resources associated to the new capacities and using
   the old demands and/or
   the old capacity and/or
   the new demands and/or
   the plurality of conditional probabilities and/or
   an operating cost per unit of capacity per time slot and/or
   a penalty cost per unit of demand unsatisfied per time slot and/or
   a scaling cost per unit of capacity and/or,
   a duration of the time slots
In other words, this step is configured to determine the cost to reconfigure the new calculation resources associated to the functions. This cost is generated by the lead time to activate and configure new virtual functions together with infrastructure cost that incur during these reconfigurations.

A step 204 of selecting the new configuration as being the available configuration associated to the minimal reconfiguration cost. The combination of these two previous steps (203 and 204) is also called step of elastic controlling of the resources. In other words, the combination of these two previous steps is configured to control the resources that takes as inputs the output of the steps 201 and 202 and optimizes the service chain configuration to minimize the state reconfiguration while being able to serve the incoming demands without any lead time and reducing the possible oscillations due to frequent and short length traffic variations.

In an embodiment the first step 201 of determining an old demand (also known as step of analytics load prediction) monitors and analyzes current traffic load and predicts the future traffic by smoothing small traffic oscillations that would trigger costly service reconfigurations. This step reads the actual load indicators from different interfaces, i.e. ports that interface each virtual function with the others in the service chain. This step can also read current traffic coming from the outside of the network. The analytics load predictor then takes these reading and compute the current demand or load conditions. Similarly based on the past readings that are accessible to this engine from a backend database, it computes relevant behaviors of the past demands that are used in the prediction phase. The prediction phase combines the actual load and the past demand to predict incoming/future load or demand by smoothing the traffic variations based on the historical analysis of the time-series traffic variation characteristics. Such a step provides a load predictor that is not sensitive to short length traffic variations. In a more advanced embodiment, the step of analytics load prediction can make use of external information from news or external event sources to determine whether and unexpected load may hit a particular application considered.

In an embodiment the first determination step 201 is also configured:
to average the old demands of the function over a predefined number of the previous time slots or
to select the maximum of the old demands of the function over a predefined number of the previous time slots.

In an embodiment of the first determination step 201, the historical data are the previous demands $H_{d,t}$ where d is the date and t is the time during the day. The data are separated into those for working days and those for weekends and holidays. This operation is repeated on each set of data. The time during the day is divided into time slots of length $\tau'$ which is the lead time of scaling. $H_{d,t}$ is aggregated over each time slot: for time slot w that spans between t and t+$\tau'$, we select a statistics $F_{d,w}=f(H_{d,t}, \ldots, H_{d,t+\tau'})$ of the previous demands over it to represent these demands. For instance, $F_{d,w}$ can be the average demand $(H_{d,t}, \ldots, H_{d,t+\tau'})/\tau'$ or the demand maximal $\max(H_{d,t}, \ldots, H_{d,t+\tau'})$. We discretize $F_{d,w}$ over the capacity of a virtual machine c:

$$D_{d,w} = \left\lceil \frac{F_{d,w}}{c} \right\rceil.$$

Each virtual machine is mapped in a real computer and is supposed to have same capacity.

In an embodiment the second determination step 202 is also configured to determine the plurality of conditional probability associated to the old demand and to a plurality of new demands. This determination is realized by taking the ratio between:
a number of occurrences where within the future time slots the function handles the new demands and where within the old time slots the function handles the old demand and
a number of occurrences where within the future time slots the function handles the old demand.

In this embodiment the second determination step 202 can also be configured to use the formula:

$$P(D_{w+1} = j \mid D_w = i) = \frac{N_{i,j,w}}{N_{i,w}}$$

wherein $$D_w = \left\lceil \frac{F_w}{c} \right\rceil$$

and,
$F_w$ is the demand associated to the time slot w and c is the number of capacity included within the computer and, $P(D_{w+1}=f|D_w=i)$ is the conditional probability that during the time slot w+1 the function handles a demand j knowing that during the time slot w the function handles a demand i and $N_{i,w}$ is a number of occurrences where within the time slot w the function handles a demand i and $N_{i,j,w}$ is a number of occurrences where within the time slot w+1 the function handles a demand j and where within the time slot w the function handles a demand i.

In an embodiment the third step 203 of determining a plurality of reconfiguration costs profiles the costs associated to instantiating configuring and operating the application virtual functions by considering diverse load conditions and resource utilizations. This step takes off line profiles of operating costs and penalties costs when the application is not running the virtual functions with sufficient resources, for instance during the lead time. This mechanism combines physical indicators like CPU utilization and memory usage together with application elements (e.g. a Virtual Machine) and application indicators like end-to-end performance indicators and generated the above mentioned costs.

In an embodiment the third determination step 203 is also configured to determine a plurality of reconfiguration costs associated to available configurations of calculation resources associated to the new capacities by determining and/or summing;
  a cost of operating the plurality of new available configuration by multiplying the new capacity by a operating cost per unit of capacity per time slot and eventually by a duration of the time slot and/or
  a cost of scaling the plurality of new available configuration by multiplying a scaling cost per unit of capacity by the absolute value of the difference of the old capacity and the new capacity and/or
  a penalty of demand unsatisfied by summing a plurality of penalty costs associated to available demands higher than the new capacity these penalty are determined by multiplying a penalty cost per unit of demand unsatisfied by the probability that previous time slots handling a old demand associated to a old demand are being follow by future time slots handling the higher demand.

In this embodiment the third determination step 203 can also configured to use the formula:

$$C_l = c_o \tau l + c_s |l-k| + c_u \tau \Sigma_{j,j>l} P(D_{w+1}=j|D_w=i)(j-l)$$

wherein $C_l$ is the reconfiguration cost associated to the capacity l and $c_o$ is a operating cost per unit of capacity per time slot and
$c_u$ is a penalty cost per unit of demand unsatisfied and
$c_s$ is a scaling cost per unit of capacity and
$P(D_{w+1}=j|D_w=i)$ is the conditional probability that during the time slot w+1 the function handles a demand j knowing that during the time slot w the function handles a demand i and
$\tau$ is the duration of the time slot and
j is the demand that will be handled in the future time slots w+1 and
i is the demand handled in the previous time slots w and
k is the capacity in the previous time slots w In other words $c_o$ can be the costs of keeping the calculation resources running, such as the electricity cost to run the cloud infrastructures. $c_u$ is incurred when the capacity is below the demand. This deficiency causes service degradation and leads to the violation of service level agreements. Monetary penalties specified in service level agreements then follow. $c_s$ is the cost of changing the capacities. The cloud system is in a transient state during the capacity changes. This may lead to service degradation and penalty for the violation of service levels.

In another embodiment of the third determination step 203 we suppose in time slot w that the function can handle a demand i and we need to make a scaling decision. In order to make this scaling decision, costs of scaling associated to a plurality of new capacities l are determined. Firstly we extract the conditional or transition probability of the demand handled in the next time slot $D_{w+1}$ from the current demand $D_w$ in the time slot w: $P(D_{w+1}=j|D_w=i)$. The cost of scaling is decided by trading off different costs.

The operating cost.
The penalty of demand unsatisfied.
The scaling cost.

When the demand increases and we don't scale the capacity, we avoid incurring the scaling cost, but may have to incur penalty cost for not meeting demands. When the demand decreases and we don't scale the capacity, we avoid incurring the scaling cost, but may have to incur operating cost on idle capacity.

In an embodiment the step of 204 selecting the new configuration (also known as step of elastic controlling of the resources) optimizes the virtual functions resources. This optimization is made by knowing the predicted workload from the analytics load predictor and the cost factors form the cost estimator step. This analytics elastic controller step enables the optimization of the virtual functions resources. At any point in time the optimal configuration generated from this controller guarantees minimal reconfigurations of the service chain virtual functions such that they operates in a stable state which is able to serve the current and near future demand.

Figure 3:
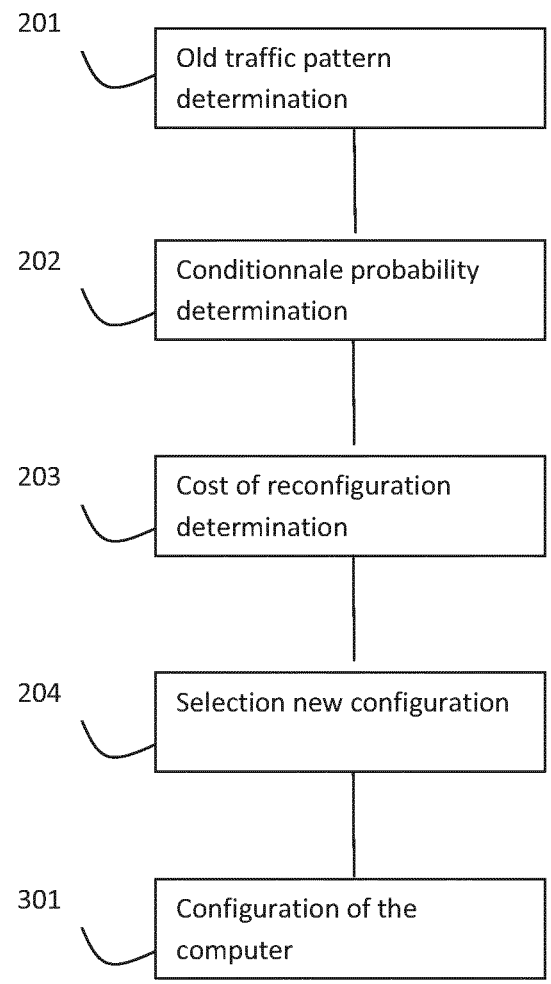
FIG. 3 illustrates a second embodiment of the method object of the present subject matter.

The FIG. 3 presents another embodiment of the reconfiguration method. In this embodiment the reconfiguration method also comprises a step 301 of configuring the computer with the new configuration during the future time slot.

Figure 4:
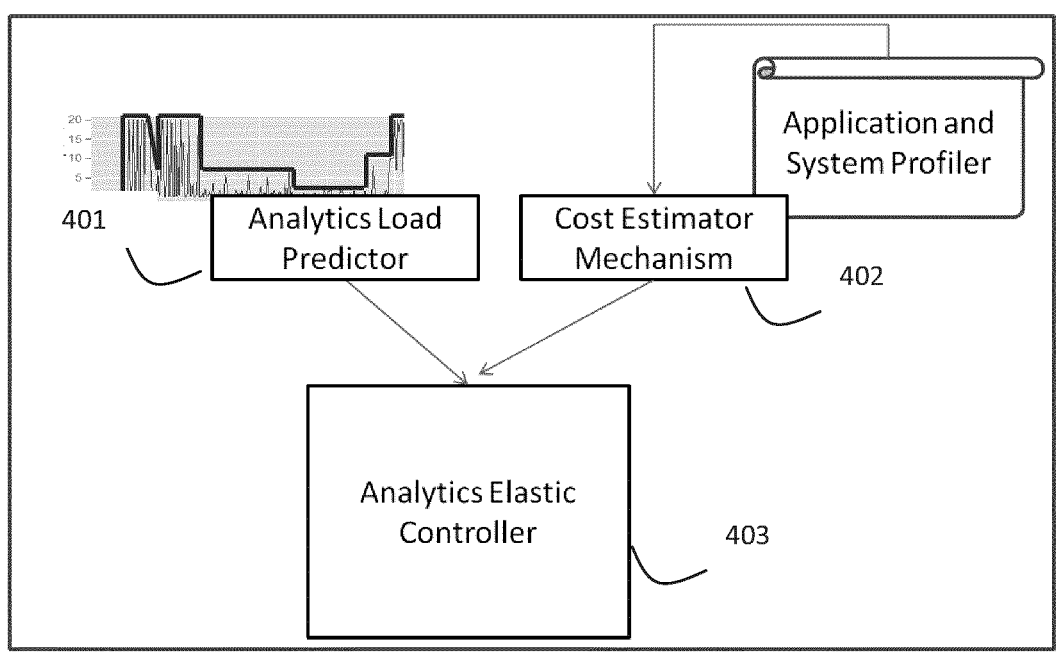
FIG. 4 illustrates a first embodiment of the equipment object of the present subject matter.

The FIG. 4 presents an embodiment of an equipment dedicated to the configuration of the resources of a virtualized infrastructure. These resources are associated to a network function. In the present embodiment the equipment comprises:
  A first determination module 401 (also known as analytics load predictor module), this module is configured to determine an old demand associated to the function and to at least one previous time slot. The aim of this first determination module is to determine the incoming load or demand by smoothing traffic variations based on the historical analysis of the time-series traffic variation characteristics. This module is also called module of load prediction and in can also be configured to estimate the incoming load by smoothing traffic variations based on the historical analysis of the time-series traffic variation characteristics.
  A second determination module, this module is configured to determine a plurality of conditional probabilities associated to the old demand and to a plurality of new demands, these conditional probabilities representing the probability that previous time slots handling an old demand are being followed by future time slots handling a new demand.
  A third determination 402 module (also known as cost estimator mechanism), this module is configured to determine a plurality of reconfiguration costs associated to a plurality of available configurations of calculation resources associated to the new capacities. This module is also called module of cost estimation, and it can be configured to determine the costs to reconfigure the resources associated to the virtual functions these costs are particularly cause by the lead time to activate and configure new virtual functions together with infrastructure costs that incur during these reconfigurations.

A module 403 (also known as analytics elastic controller module) configured to select the new configuration as being the available new configuration associated to the minimal reconfiguration cost. The combination of the two previous modules is also called analytics elastic controller module. The combination of the two previous modules can be configured to take as inputs the output of the two first modules and optimizes the service chain configuration to minimize the state reconfiguration while being able to serve the incoming demand without any lead time and reducing the possible oscillations due to frequent and short length traffic variations.

In an embodiment the first determination module 401 (also known as analytics load predictor) monitors and analyzes current traffic load and predicts the future traffic by smoothing small traffic oscillations that would trigger costly service reconfigurations. This module reads the actual load indicators from different interfaces, i.e. ports that interface each virtual function with the others in the service chain. This module can also read current traffic coming from the outside, i.e. the network. The analytics load predictor then takes these reading and compute the current traffic/load conditions. Similarly based on the past readings that are accessible to this engine from a backend database, it computes relevant behaviors of the past demands that are used in the prediction phase. The prediction phase combines the actual load and the past demands to predict incoming/future load by smoothing the traffic variations based on the historical analysis of the time-series traffic variation characteristics. Such a module provides a load predictor that is not sensitive to short length traffic variations. More advanced analytics engines can make use of external information from news or external event sources to determine whether and unexpected load may hit a particular application considered.

In an embodiment the third determination module 402 (also known as cost estimator mechanism) profiles the costs associated to instantiating configuring and operating the application virtual functions by considering diverse load conditions and resource utilizations. This module takes off line profiles of operating costs and penalties costs when the application is not running the virtual functions with sufficient resources, for instance during the lead time. This mechanism combines physical indicators like CPU utilization and memory usage together with application elements (e.g. a Virtual Machine) and application indicators like end-to-end performance indicators and generated the above mentioned costs.

In an embodiment the module 403 configured to select the new configuration (also known as analytics elastic controller module) optimizes the virtual functions resources. This optimization is made by knowing the predicted workload from the analytics load predictor and the cost factors form the cost estimator module. This analytics elastic controller module enables the optimization of the virtual functions resources. At any point in time the optimal configuration generated from this controller guarantees minimal reconfigurations of the service chain virtual functions such that they operates in a stable state which is able to serve the current and near future demand.

In an embodiment the method is realized through software implemented computer program i.e. the cloud service management system for optimized resource management. In a cloud datacenter the method connects with the streams of continuous system level measurements, incoming traffic load and the key performance indicators (KPI) from all resources (e.g., CPU, memory, network) and with the application elements (e.g. a Virtual Machine) it is running. The method directs these data streams and application specific information into the analytics load predictor and the cost estimator mechanism. Based on the predicted targeted load and the cost profiles generated by the cost estimator, the analytics elastic controller proactively optimizes deployment (e.g. the number of instances of a specific VM) to minimize the scaling of virtual elements while optimally serving the actual demand with zero lead time.

In an embodiment the different modules are realized using one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 2:
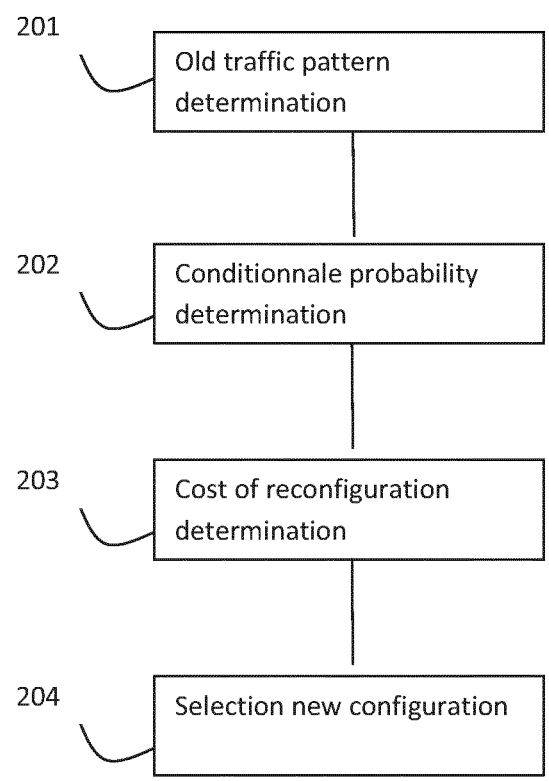
FIG. 2 illustrates a first embodiment of the method object of the present subject matter.

In an embodiment of the subject matter, the configuration method described FIG. 2 can be performed by programmed computers. This method can determine a new configuration of calculation resources associated to a function and to at least one future time slot. The calculation resources are defined as different calculation capacities allocated to the function during a time slot and included within at least one computer. The configuration method comprises;

a first step (201) of determining an old demand associated to the function and to at least one previous time slot, the previous times slots being located before the future time slots, and, a second step (202) of determining a plurality of conditional probabilities associated to the old demand and to a plurality of new demands, these conditional probabilities representing the probability that previous time slots handling old demands are being follow by future time slots handling new demands and, a third step (203) of determining a plurality of reconfiguration costs associated to a plurality available configurations of calculation resources associated to the new capacities and using
the old demands and/or
the old capacity and/or
the new demands and/or
the plurality of conditional probabilities and/or
an operating cost per unit of demand per time slot and/or
a penalty cost per unit of demand unsatisfied per time slot and/or
a scaling cost per unit of demand and/or,
a duration of the time slots
a step (204) of selecting the new configuration as being the available configuration associated to the minimal reconfiguration cost.

Even though different embodiments of the method and equipment of the object of the present subject matter describe the management of service chains for telecommunication services, the same principles apply to the management of services in other domains (e.g., a Web service).

Figure 5:
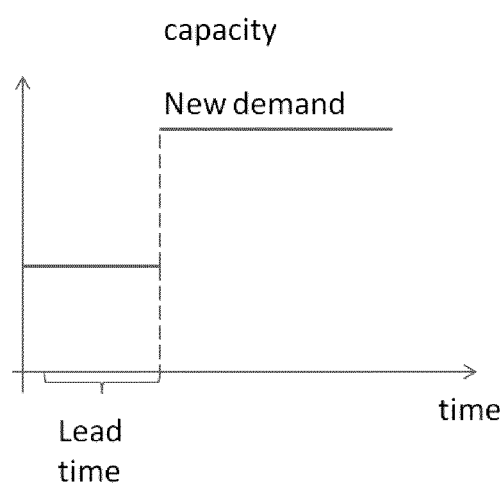
FIG. 5 illustrates the self configuring the application service chain to new states as the demand/load changes.

So by using the different embodiments of the method and equipment of the object of the present subject matter, the cloud infrastructure can be proactively configuring according to the application service chain to new states as the demand/load changes, as showed in FIG. 5.

Thus, the embodiments of the method and equipment object of the present subject matter provide the logic of an analytics engine that detects rapid traffic variations, considers operation and management costs of scaling virtual functions. Then, via an analytics elastic controller it optimizes service chain virtual resources taking into account longer term traffic estimation to optimized application performance while reducing SLA violations, poor quality of service and management costs.

The embodiments of the method and equipment object of the present subject matter provide a way to handle with frequent scaling up and down oscillations of virtual elements when the incoming traffic has frequent and short length variations. These frequent state reconfigurations (given high variation of incoming load) can produce SLA violations, poor quality of services and high management costs for operators to constantly manage the changing status of the service chain. The embodiments of the method and equipment object of the present subject provides a way to avoid these previously described drawbacks The embodiments of the method and equipment object of the present subject matter operate the virtual functions reconfiguration even with an unstable service chain management approach.

The embodiments of the method and equipment object of the present subject matter implement a proactive approach by leveraging predictive analytics and optimization strategies that are able to prepare the system to future demands while avoiding lead time and service oscillations among different configurations. Thus, the embodiments of the method and equipment object of the present subject matter alleviate the SLA violations, poor quality of service and management costs.

In some situation, Complex Cloud application may consist of completely different parts (e.g. in the context of IMS, e.g. CSCF, an HSS or a MGW) that are scaled based on static thresholds and do not take traffic fluctuation into account. If traffic quickly drops the actual elastic monitor triggers the thresholds to scale down of the respective virtual elements in the service chain; then, if the traffic, immediately after the virtual element contraction, grows back to the previous status the application service transits back to the previous status. The method and equipment of the present subject matter, especially the elastic controller module or step are able to detect rapid traffic variations and to guide the analytics elastic controller base on the smoothed traffic estimations computed by the integrates the real time traffic predictor module to initiate an informed decision to maintain the service resources stable to manage the near-future incoming load.

The invention claimed is:

1. A configuration method for determining a new configuration of calculation resources associated to a function and to at least one future time slot,
    the calculation resources being defined as different calculation capacities allocated to the function during a time slot and included within at least one computer,
    the configuration method comprising;
        determining an old demand associated to the function and to at least one previous time slot, the at least one previous time slot being located before the at least one future time slot, and,
        determining a plurality of conditional probabilities associated to the old demand and to a plurality of new demands, each conditional probability representing a probability that a previous time slot handling the old demand is being followed by a future time slot handling a new demand and,
        determining a plurality of reconfiguration costs associated to a plurality of available configurations of calculation resources associated to respective new capacities and using at least one of:
            one or more old demands;
            an old capacity;
            the plurality of conditional probabilities;
            an operating cost per unit of capacity per time slot
            a penalty cost per unit of demand unsatisfied per time slot; and
            a scaling cost per unit of capacity;
    the method further comprising selecting the new configuration as being an available configuration associated to a minimal reconfiguration cost.

2. The configuration method according to claim 1 wherein;
    the first determination is configured to at least one of:

average the one or more old demands of the function over a predefined number of the previous time slots; and select the maximum of the one or more old demands of the function over a predefined number of the previous time slots.

3. The configuration method according to claim 1 wherein:

the second determination is configured to determine the plurality of conditional probabilities associated to the old demand and to at least one new demand, as being the ratio between a number of occurrences where within the at least one future time slot the function handles the at least one new demand and where within the at least one previous time slot the function handles the old demand and a number of occurrences where within the at least one future time slot the function handles the old demand.

4. The configuration method according to claim 1 wherein;

the second determination is also configured to use the formula:

$$P(D_{w+1} = j \mid D_w = i) = \frac{N_{i,j,w}}{N_{i,w}}$$

wherein $$D_w = \left\lceil \frac{F_w}{c} \right\rceil$$

and, $F_w$ is the demand associated to the time slot w and c is the number of capacity included within the computer and, $P(D_{w+1}=j|D_w=i)$ is the conditional probability that during the time slot w+1 the function handles a demand j knowing that during the time slot w the function handles a demand i and $N_{i,w}$ is a number of occurrences where within the time slot w the function handles a demand i and $N_{i,j,w}$ is a number of occurrences where within the time slot w+1 the function handles a demand j and where within the time slot w the function handles a demand i.

5. The configuration method according to claim 1 wherein;

the third determination is also configured to determine a plurality of reconfiguration costs associated to available configurations of calculation resources associated to the new capacities by determining and summing at least one of;

a cost of operating the plurality of new available configurations by multiplying the new capacity by an operating cost per unit of capacity per time slot and eventually by a duration of the time slot; and a cost of scaling the plurality of new available configurations by multiplying a scaling cost per unit of capacity by the absolute value of the difference of the old capacity and the new capacity; and a penalty of demand unsatisfied by summing a plurality of penalty costs associated to one or more new demands higher than the new capacity is determined by multiplying a penalty cost per unit of demand unsatisfied by the probability that one or more previous time slots handling an old demand associated to an old demand are being followed by one or more future time slots requiring the higher demand.

6. The configuration method according to claim 1 wherein;

the third determination is also configured to use the formula:

$$C_l = c_o \tau l + c_s |l-k| + c_u \tau \Sigma_{j,j>l} P(D_{w+1}=j|D_w=i)(j-l)$$

wherein $C_l$ is the reconfiguration cost associated to the capacity l and $c_o$ is a operating cost per unit of capacity per time slot and $c_u$ is a penalty cost per unit of demand unsatisfied and $c_s$ is a scaling cost per unit of capacity and $P(D_{w+1}=j|D_w=i)$ is the conditional probability that during the time slot w+1 the function handles a demand j knowing that during the time slot w the function handles a demand i and $\tau$ is the duration of the time slot and j is the demand that will be handled in the future time slots w+1 and i is the demand handled in the previous time slots w and k is the capacity in the previous time slots w.

7. The configuration method, according to claim 1, further comprising;

configuring the computer with the new configuration during the at least one future time slot.

8. An equipment for determining a new configuration of calculation resources associated to a function and to at least one future time slot, the calculation resources being defined as one or more different calculation capacities allocated to the function during a time slot and included within at least one computer, the equipment comprising:

at least one processor;

and at least one memory coupled to the processor;

at least one of the memories having stored thereon a first determination module executable by the at least one processor, and configured to determine an old demand associated to the function and to at least one previous time slot, at least one of the memories having stored thereon a second determination module executable by the at least one processor, and configured to determine a plurality of conditional probabilities associated to the old demand and to a plurality of new demands, each conditional probability representing a probability that a previous time slot handling the old demand is being followed by a future time slot handling a new demand and, at least one of the memories having stored thereon a third determination module executable by the at least one processor, and configured to determine a plurality of reconfiguration costs associated to a plurality of available configurations of calculation resources associated to one or more new capacities and using one or more of;

one or more old demands;

an old capacity;

the plurality of conditional probabilities;

an operating cost per unit of capacity per time slot;

a penalty cost per unit of demand unsatisfied per time slot; and a scaling cost per unit of capacity;

the equipment further comprising a selection module configured to select the new configuration as being the available configuration associated to a minimal reconfiguration cost.

9. The equipment according to claim 8 further comprising;
a configuration module adapted to configure the computer with the new configuration during the at least one future time slot.

10. The equipment according to claim 8 further comprising;
at least one processor;
and at least one memory coupled to the processor,
the said memory comprising the said first, second and third determination module and the said selection module and the said configuration module.

11. A system for determining a new configuration of calculation resources associated to a function and to at least one future time slot,
the calculation resources being defined as different calculation capacities allocated to the function during a time slot and included within at least one computer,
the system comprising at least one equipment and each equipment comprising
at least one processor;
and at least one memory coupled to the processor,
at least one of the memories having stored thereon a first determination module executable by the at least one processor, and configured to determine an old demand associated to the function and to at least one previous time slot,
at least one of the memories having stored thereon a second determination module executable by the at least one processor, and configured to determine a plurality of conditional probabilities associated to the old demand and to a plurality of new demands, each conditional probability representing a probability that a previous time slot handling the old demand is being followed by at least one future time slot handling a new demand and,
at least one of the memories having stored thereon a third determination module executable by the at least one processor, and configured to determine a plurality of reconfiguration costs associated to a plurality of available configurations of calculation resources associated to respective new capacities and using at least one of;
one or more old demands;
an old capacity;
the plurality of conditional probabilities;
an operating cost per unit of capacity per time slot;
a penalty cost per unit of demand unsatisfied per time slot; and
a scaling cost per unit of capacity;
at least one of the memories having stored thereon a selection module executable by the at least one processor and configured to select the new configuration as being an available configuration associated to a minimal reconfiguration cost.

12. A non-transitory computer-readable medium having embodied thereon a computer program configured to realize a configuration method for determining a new configuration of calculation resources associated to a function and to at least one future time slot,
the calculation resources being defined as different calculation capacities allocated to the function during a time slot and included within at least one computer,
the configuration method comprising;
determining an old demand associated to the function and to at least one previous time slot, the at least one previous time slot being located before the at least one future time slot, and,
determining a plurality of conditional probabilities associated to the old demand and to a plurality of new demands, each conditional probability representing a probability that a previous time slot handling the old demand is being followed by a future time slot handling a new demand and,
determining a plurality of reconfiguration costs associated to a plurality of available configurations of calculation resources associated to respective new capacities and using at least one of:
one or more old demands;
an old capacity;
the plurality of conditional probabilities;
an operating cost per unit of capacity per time slot;
a penalty cost per unit of demand unsatisfied per time slot; and
a scaling cost per unit of capacity;
the method further comprising selecting the new configuration as being an available configuration associated to a minimal reconfiguration cost.

* * * * *